United States Patent [19]

Lim et al.

[11] Patent Number: 6,037,969
[45] Date of Patent: Mar. 14, 2000

[54] METHOD AND APPARATUS FOR BLOCKING OUT IMPROPER TELEVISION PROGRAMS

[75] Inventors: Ji-Hoon Lim, Kyeongki-Do; Jae-Chul Park, Chungcheongnam-Do, both of Rep. of Korea

[73] Assignee: Daewoo Electronics Co., Ltd., Seoul, Rep. of Korea

[21] Appl. No.: 09/191,340

[22] Filed: Nov. 13, 1998

[30] Foreign Application Priority Data

Jun. 29, 1998 [KR] Rep. of Korea ............... 98-25196

[51] Int. Cl.[7] ............................................. H04N 7/16
[52] U.S. Cl. ................................... 348/5.5; 380/15
[58] Field of Search .............................. 348/5.5; 380/10, 380/12, 13, 15

[56] References Cited

U.S. PATENT DOCUMENTS

| | | |
|---|---|---|
| 3,919,462 | 11/1975 | Hartung et al. ........................ 178/5.1 |
| 4,510,623 | 4/1985 | Bonneau et al. ........................ 455/181 |
| 4,554,584 | 11/1985 | Elam et al. . |
| 4,605,964 | 8/1986 | Chard . |
| 4,888,796 | 12/1989 | Olivo, Jr. . |
| 4,930,158 | 5/1990 | Vogel . |
| 4,930,160 | 5/1990 | Vogel . |
| 5,172,111 | 12/1992 | Olivo, Jr. . |
| 5,195,135 | 3/1993 | Palmer . |
| 5,270,822 | 12/1993 | Choi . |
| 5,387,942 | 2/1995 | Lemelson . |
| 5,485,518 | 1/1996 | Hunter et al. . |
| 5,550,575 | 8/1996 | West et al. . |
| 5,569,366 | 10/1996 | Chen et al. . |
| 5,583,576 | 12/1996 | Perlman et al. . |
| 5,677,743 | 10/1997 | Terao et al. ........................ 348/735 |
| 5,737,479 | 4/1998 | Fujinami . |
| 5,864,621 | 1/1999 | Katznelson ........................ 380/15 |

*Primary Examiner*—Andrew I. Faile
*Assistant Examiner*—Ngoc Vu
*Attorney, Agent, or Firm*—Pillsbury Madison & Sutro LLP

[57] ABSTRACT

A received television program is blocked out when a rating of the program is not within a scope of a preset rating. A rating signal is extracted from a video signal of the television program, and the rating signal is decoded to detect the rating of the program. The rating of the program is compared with the preset rating and an automatic frequency control (AFC) circuit is forced into an inoperative state to block out an output of the received television program when the comparison shows that the rating of the detected program is not within the scope of the preset rating. Accordingly, the blocking-out function against improper programs can be achieved by detecting the rating of the received program and by making the AFC circuit inoperative.

3 Claims, 10 Drawing Sheets

60 — 
```
▷ PARENTAL GUIDE           : OFF
   TELEVISION GUIDELINES
   BLOCK PROGRAMS ABOVE : TV-G
   MOTION PICTURE GUIDELINES
   BLOCK PROGRAMS ABOVE :  G

UNRATED PROGRAMS       : BLOCK
   SET ACCESS CODE
   ▲▼ : SELECT   ◀▶ : CHANGE   ■ : EXIT
```

FIG. 9

| RATING | (ALL) | FV | V | S | L | D |
|---|---|---|---|---|---|---|
| TV-MA | X | | X | X | X | |
| TV-14 | X | | X | X | X | X |
| TV-PG | X | | X | X | X | X |
| TV-G | X | | | | | |
| TV-Y7 | X | X | | | | |
| TV-Y | X | | | | | |

▲▼ ◀▶ : MOVE CURSOR
NUMBER 0 : CHANGE STATUS
■ : PREVIOUS MENU   X : BLOCKED

HELP MESSEGE

FIG. 10

| | | FV | V | L | S | D |
|---|---|---|---|---|---|---|
| TV-Y | ALL CHILDREN | | | | | |
| TV-Y7 | FOR CHILDREN AGE 7 AND ABOVE | MILD FANTASY OR COMEDIC VIOLENCE | | | | |
| TV-G | GENERAL AUDIENCE | | | | | |
| TV-PG | PARENTAL GUIDANCE SUGGESTED | | MODERATE VIOLENCE | INFREQUENT COARSE LANGUAGE | SOME SEXUAL SITUATIONS | SOME SUGGESTIVE DIALOGUE |
| TV-14 | PARENTS STRONGLY CAUTIONED (UNSUITABLE FOR CHILDREN UNDER 14 YEARS OF AGE) | | INTENSE VIOLENCE | STRONG COARSE LANGUAGE | INTENSE SEXUAL SITUATIONS | INTENSELY SUGGESTIVE DIALOGUE |
| TV-MA | MATURE AUDIENCE ONLY (UNSUITABLE FOR CHILDREN UNDER 17) | | GRAPHIC VIOLENCE | CRUDE INDECENT LANGUAGE | EXPLICIT SEXUAL ACTIVITY | |

FIG. 11

| MPAA | RATING | | |
|---|---|---|---|
| X | X | ▲▼ : | MOVE CURSOR |
| NC-17 | X | ◀▶ : | CHANGE STATUS |
| R | X | ■ : | PREVIOUS MENU |
| PG-13 | X | X : | BLOCKED |
| PG | X | | |
| G | X | | |

HELP MESSEGE

FIG. 12

G    :  "GENERAL AUDIENCES – ALL AGES ADMITTED"
PG   :  "PARENTAL GUIDANCE SUGGESTED"
PG-13:  "INAPPROPRIATE FOR CHILDREN UNDER 13"
R    :  "RESTRICTED, UNDER 17"
        "REQUIRES ACCOMPANYING PARENT OR ADULT GUARDIAN"
NC-17,X : "NO ONE 17 AND UNDER ADMITTED"

FIG. 13

PROGRAM RATING IS TV-PG-VSLD

TV-PG : PARENTAL GUIDANCE SUGGESTED
    V : INTENSE VIOLENSE
    S : SOME SEXUAL SITUATIONS
    L : INFREQUENT COARSE LANGUAGE
    D : SOME SUGGESTIVE DIALOGUE

ENTER YOUR ACCESS CODE : _______

METHOD AND APPARATUS FOR BLOCKING OUT IMPROPER TELEVISION PROGRAMS

BACKGROUND OF THE INVENTION

1. Field of the Invention

The present invention relates in general to a television system and, more particularly, to a method which can block out a video output by handling an automatic frequency control (AFC) function based on verification of a television program rating and to a television receiver having a restriction function on watching a television program.

2. Description of the Prior Art

As children and youngsters increasingly imitate misbehavior and violence learnt from television programs or films and some of them in fact commit crimes, many parents have worried about these phenomena. Whereas a rating system for films has prevented young viewers from watching improper films, there has been no effective system for television programs.

In the United States, thanks to a recently passed federal regulation, every television set must adopt a discretionary control feature, that is more commonly called a "V-chip" function, that blocks out the outputs of video and audio programs when parents classify a program as improper for their children. Under the regulation, television sets sold in the U.S. market must contain this function by Jan. 1, 2000.

Various prior arts relating to the discretionary control feature or the "V-chip" function are disclosed in U.S. Pat. Nos. 4,554,584; 4,605,964; 4,888,796; 4,930,158; 4,930,160; 5,172,111; 5,195,135; 5,270,822; 5,387,942; 5,485,518; 5,550,575; 5,583,576; 5,569,366; and 5,737,479.

The blocking-out operation for a television program is carried out as follows. A broadcasting station transmits a television signal including an encoded rating signal on line 21 of the 525 horizontal lines. A receiving circuit of a television set extracts and decodes the encoded rating signal on horizontal line 21 to check whether a rating of the decoded program is within or not within a scope of a preset rating by users or parents. When the program rating is not within the scope of the preset rating, the outputs of video, audio and text data are blocked out, so that the program can not be viewed. On the contrary, when the program rating is within the scope of the preset rating, the program is allowed to be viewed.

To block out a screen output based on the check of the program rating, some methods have been used which display a blue screen or a program of proper rating supplied from other sources, for example, any other channels or a video cassette recorder.

SUMMARY OF THE INVENTION

Therefore, it is an object of the present invention to provide a method capable of forcing a television screen into an inviewable state by making an AFC circuit for a horizontal sync signal inoperative when it is necessary to block out a current program from check of its rating.

It is another object of the present invention to provide a television receiving apparatus having a restriction function on watching a television program for the above method.

The first object can be achieved by a method of the present invention, which comprises the steps of: extracting a rating signal from a video signal of the video program; decoding the extracted rating signal to detect a rating of the video program; comparing the rating of the video program with a preset rating; and blocking out the output of the video signal by making an AFC circuit inoperative when the rating of the video program is not within a scope of the preset rating from the comparison.

The second object can be achieved by an apparatus of the present invention, which comprises an audio circuit section for receiving an audio signal and for processing the audio signal to output; a video circuit section for receiving a video signal and for processing the video signal to output; a sync separating section for separating a composite sync signal of the video signal from the video circuit section into a vertical sync signal and a horizontal sync signal; an AFC section for generating a phase difference signal by comparing the separated horizontal sync signal with a horizontal output signal; a horizontal oscillating section, responsive to the phase difference signal of the AFC section, for generating a horizontal oscillating signal; a horizontal output section, responsive to the horizontal oscillating signal from the horizontal oscillating section, for driving a horizontal deflection coil; a decoding section for extracting a program rating signal from the video signal and for decoding the extracted program rating signal to output a program rating; a command inputting section for setting a preset rating and a password; a memory section for storing the password and the preset rating; and a controlling section for making the AFC section inoperative to display an inviewable screen for watching when the program rating decoded by the decoding section is not within a scope of the preset rating stored in the memory section. Preferably, the AFC section includes a comparing signal generating section for generating a comparing signal by using the horizontal output signal from the horizontal output section; a first switching section, responsive to a disable signal from the controlling section, for switching the horizontal sync signal; a second switching section, responsive to the disable signal from a controlling signal, for switching the comparing signal; a phase difference detecting section for detecting a phase difference between the horizontal sync signal supplied from the first switching section and the comparing signal supplied from the second switching section; and an integrating section for generating the phase difference signal by integrating the detected phase difference.

BRIEF DESCRIPTION OF THE DRAWINGS

The above object and other advantages of the present invention will become more apparent by describing in detail preferred embodiments thereof with reference to the attached drawings, in which.

DETAILED DESCRIPTION OF THE INVENTION

Hereinafter, a preferred embodiment of the present invention will be explained in more detail with reference to the accompanying drawings.

Figure 1:
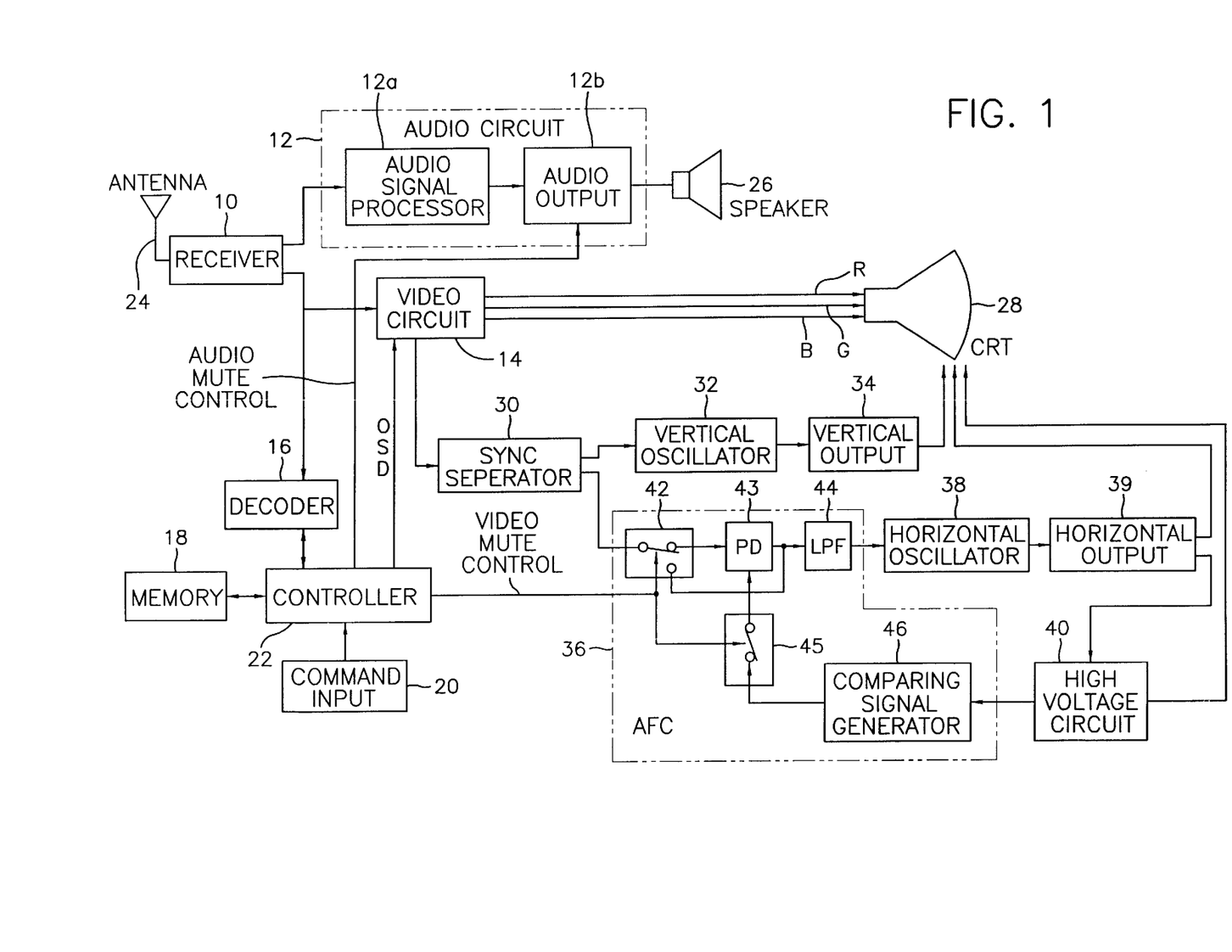
FIG. 1 is a block diagram of a television receiver of the present invention which has a restriction function on watching a television program.

FIG. 1 is a block diagram of a television receiver of the present invention which has a restriction function on watching a television program. The television receiver unit shown in FIG. 1 includes a receiving section 10, an audio circuit section 12, a video circuit section 14, a decoding section 16, a memory section 18, a command inputting section 20, and a controlling section 22. The television receiver unit further includes a sync separating section 30, a vertical oscillating section 32, a vertical outputting section 34, an AFC section 36, a horizontal oscillating section 38, a horizontal outputting section 39 and a high voltage section 40. The AFC section 36 includes a first switch 42, a second switch 45, a phase detector 43, an integrator 44 and a comparing signal generator 46.

The receiving section 10 selects one channel from multiple channels of a high frequency received through an antenna 24 by means of channel data provided from the controlling section 22. The television signal of the selected channel is separated into, and is outputted as audio and video signals through detection of an intermediate frequency.

The audio circuit section 12 receives an audio signal which is processed by an audio processing section 12a. The processed audio signal is amplified by an audio outputting section 12b, and is outputted as sound through a speaker 26. Responsive to an audio blocking-out control signal from the controlling section 22, the audio outputting section 12b blocks out the audio output.

Receiving the video signal, the video circuit section 14 separates the video signal into a color signal, a luminance signal and a sync signal, and processes each signal independently. The processed color and luminance signals are synthesized into a red green blue (RGB) signal and the RGB signal is provided to a cathode ray tube (CRT) 28. The video circuit section 14, after receiving on-screen-display (OSD) data from the controlling section 22, synthesizes the OSD data with the RGB signal, and outputs the synthesized signal of the OSD data with the RGB signal.

The command inputting section 20 includes a remote controller and a receiver for the remote controller, receives a command signal from the remote controller ordered by a user, and provides the received command signal from the remote controller to the controlling section 22. The user sets a preset rating and a password with the remote controller.

The memory section 18 can be realized by using a conventional random access memory (RAM) or non-volatile memory, and holds the password and the preset rating.

The sync separating section 30 receives a composite sync signal from the video circuit section 14, and separates the composite sync signal into a vertical sync signal and a horizontal sync signal. The vertical oscillating section 32 receives the vertical sync signal from the sync separating section 30, and generates a vertical oscillating frequency signal. Then, the vertical outputting section 34 responsive to the generated vertical oscillating frequency signal drives a vertical deflection coil of the CRT 28.

The AFC section 36 generates a phase difference signal by comparing two phases of both the horizontal sync signal and a comparing signal which is generated from the horizontal output section 39 through the comparing signal generator 46, and outputs a voltage detecting signal by integrating the phase difference signal through the integrator 44. In a blocking mode, both the first switch 42 and the second switch 45 of the AFC section 36 are switched off and thus the separated horizontal sync signal passes through the integrator 44 without being compared with the comparing signal.

The horizontal oscillating section 38 responsive to an output voltage of the AFC section 36 generates a horizontal oscillating frequency signal. The horizontal outputting section 39 which is excited by the horizontal oscillating frequency signal provides a driving source to a horizontal deflection coil of the CRT 28. The high voltage circuit 40 includes a fly-back transformer, where an output signal, that is the comparing signal, from the horizontal outputting section 39 is applied to an input port of the fly-back transformer, and provides the AFC section 36 with a transformed horizontal output voltage from an output port of the fly-back transformer.

Accordingly, in a non-blocking mode, the AFC section 36 can normally control a synchronization of the horizontal sync signal in the way of a phase-locked loop (PLL). When the AFC section 36 becomes inoperable in the blocking mode, it is impossible for the AFC section 36 to control the horizontal sync signal in the way of the PLL. Consequently, this unstable state due to failure of a horizontal synchronization for the received video signal forms a horizontally distorted screen unsuitable for watching on the CRT. However, an in-made video signal such as an OSD signal can be normally displayed on the screen of the CRT because the OSD signal is processed in a synchronized way with the horizontal oscillating frequency signal provided from the horizontal oscillating section 38.

Figure 2:
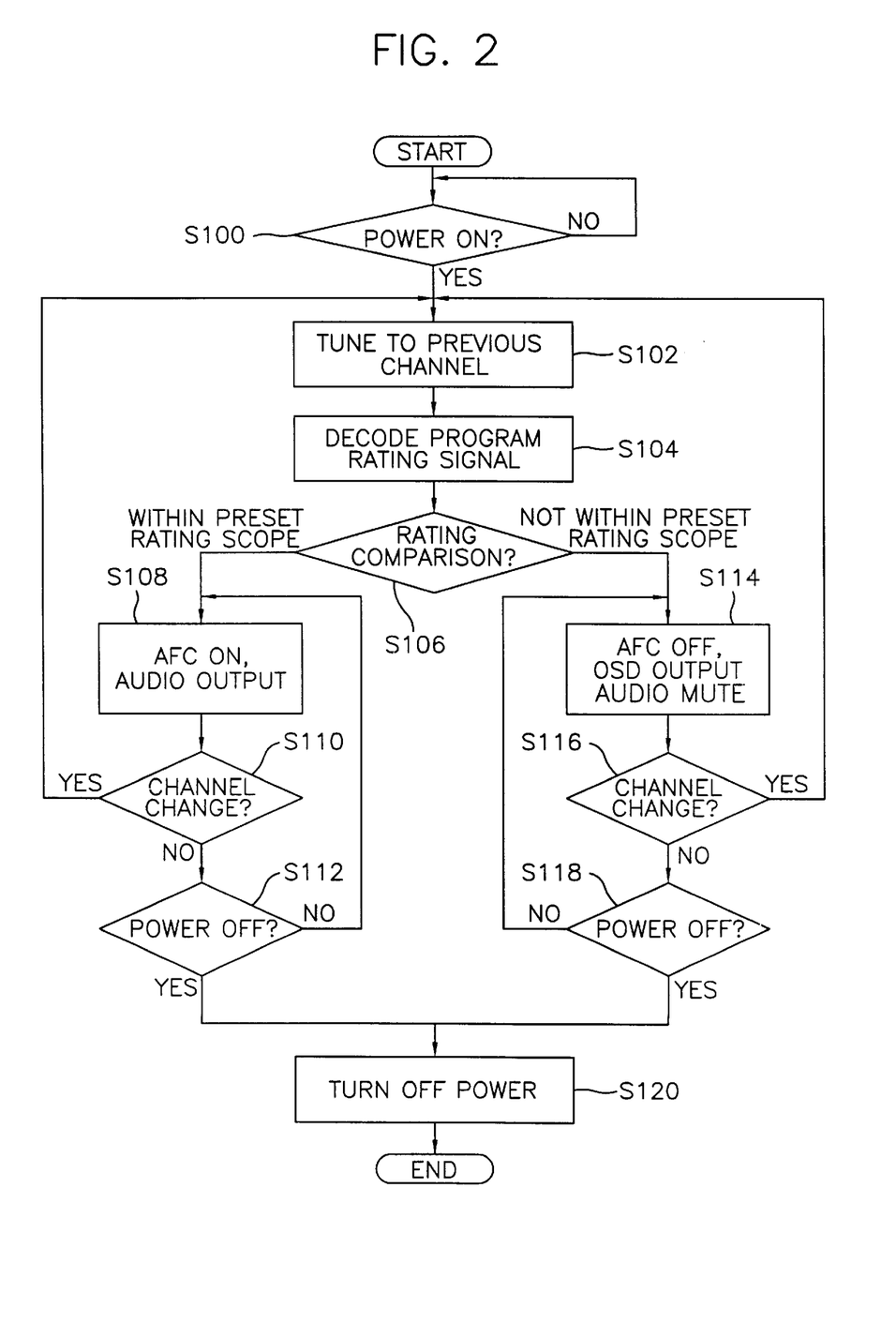
FIG. 2 is a flow chart explaining a video blocking method according to the present invention.
Figure 3A:
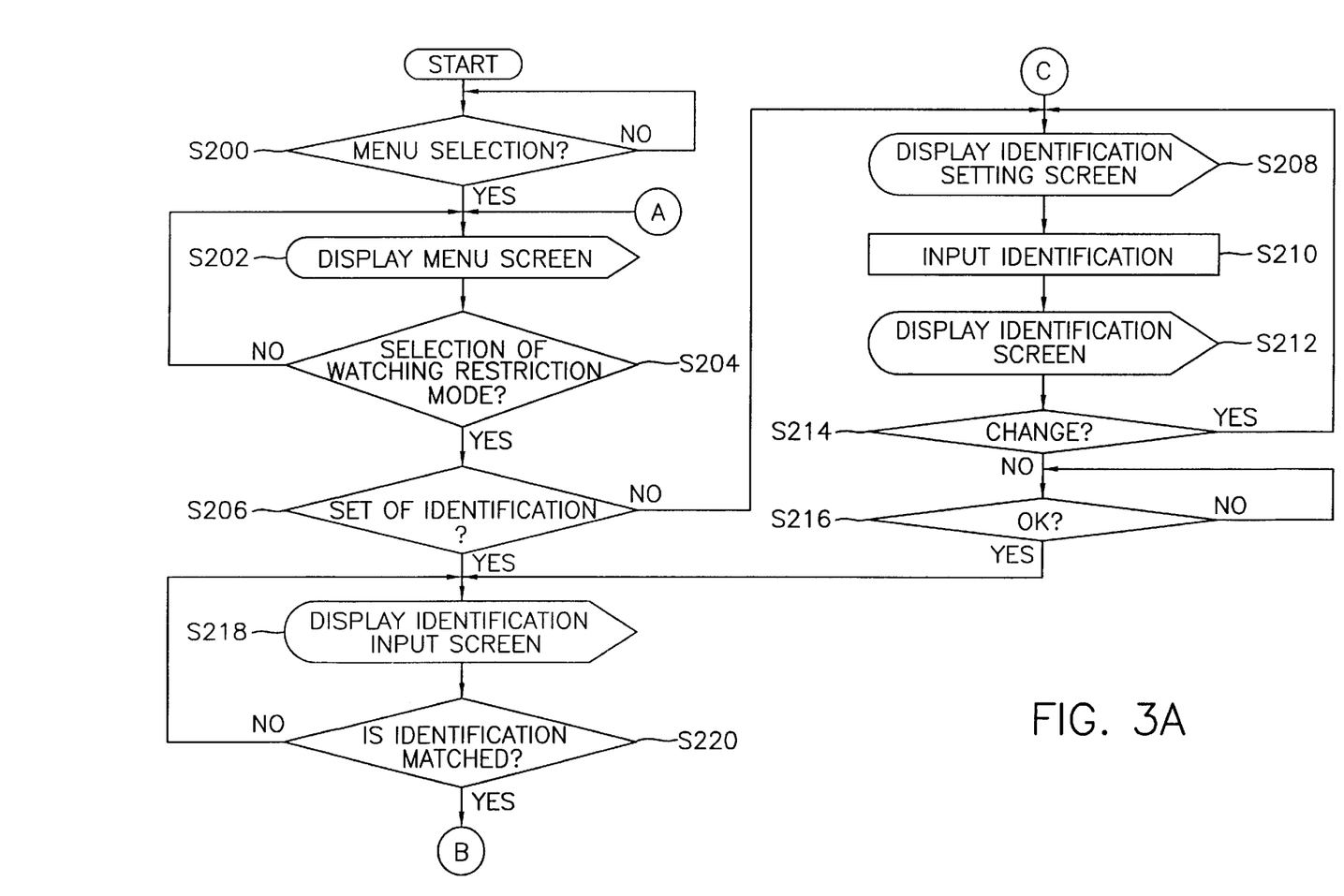
FIG. 3 is a flow chart illustrating a rating setting process for the restriction function on watching a television program.
Figure 3B:
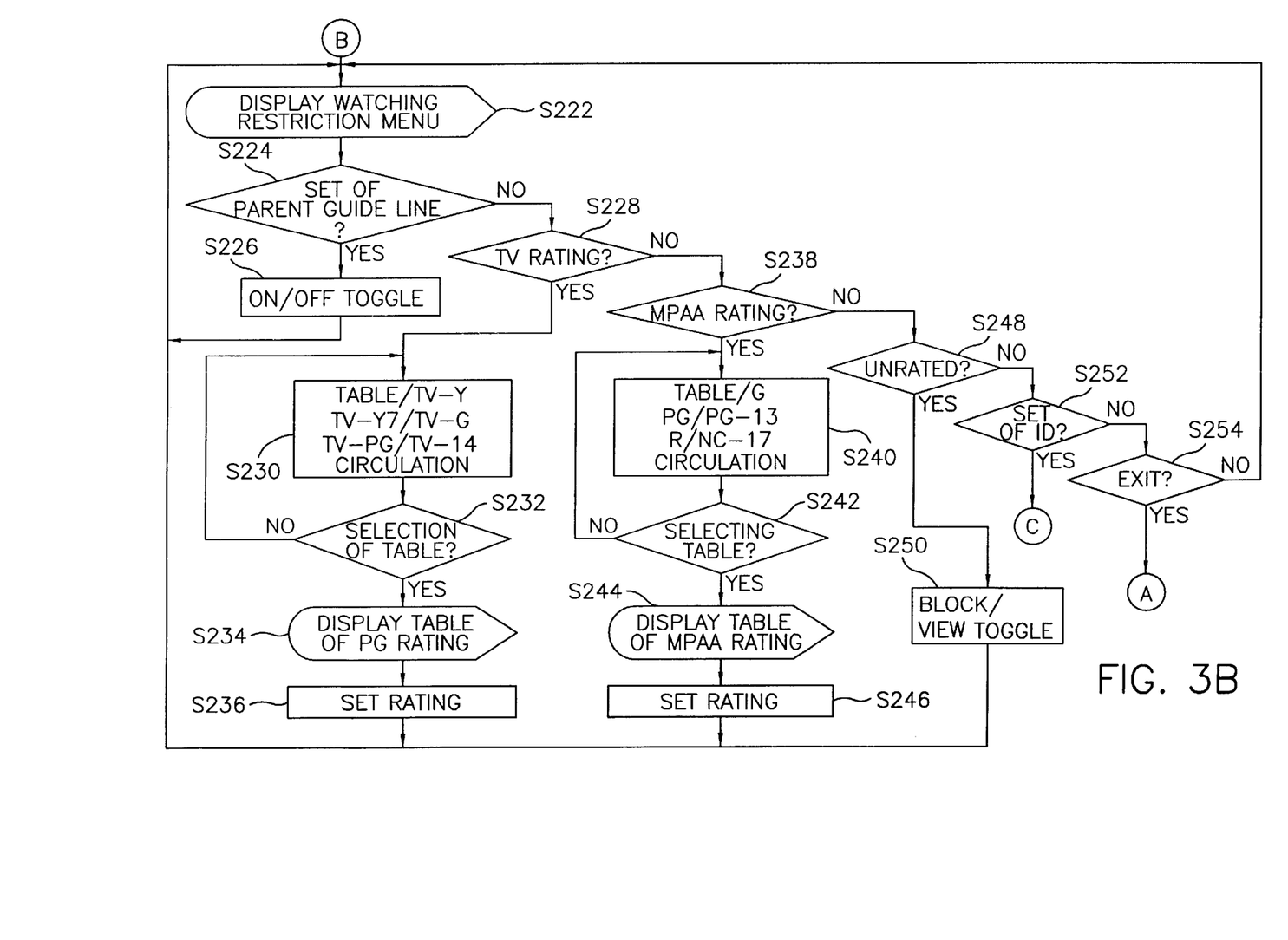

FIG. 2 is a flow chart explaining a desirable embodiment of a video blocking method according to the present invention. At first, if a user presses a power-on key of the remote controller, the controlling section 22 of the television set checks this key operation (S100), supplies a driving power to every circuit section of the television set, and controls the receiving section 10 to be tuned to a channel maintained on turning the power off. (S102).

As a rating is obtained by decoding a rating signal of a received program in the decoding section 16, the controlling section 22 compares the decoded rating code with a preset rating (S106). If the decoded rating is within the scope of the preset rating, the controlling section 22 releases the audio circuit section 12 from the blocking-out state, and at the same time makes the ACF section 36 operative to output video and audio outputs (S108). If a command for a channel change enters the controlling section 22 during the time of watching the television program, step S102 is carried out. If a power-off command arises at step S110 (S112), the television set turns the power off (S128), and finishes this procedure. Meanwhile, if the decoded rating is not within the scope of the preset rating in step S106, operations for keeping the blocking state of the audio circuit sections 12 and for making the AFC section 36 inoperative are implemented, which results in the blocking-out state, or without outputs of video and audio (S114). If a channel change command arises in the blocking out state (S124), step 102 is implemented. In step 124, if the power-off command arises (S126), the power-off operation (S120) is implemented.

Figure 4:
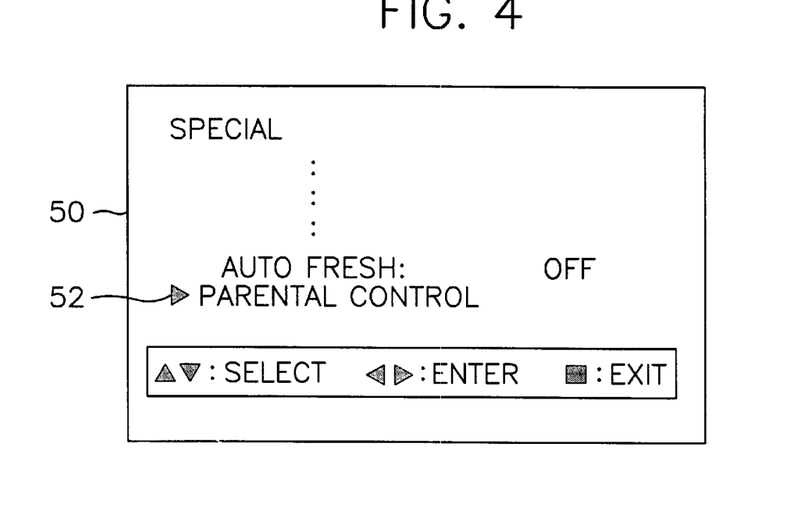
FIGS. 4 to 13 show various television screen states.
Figure 5:
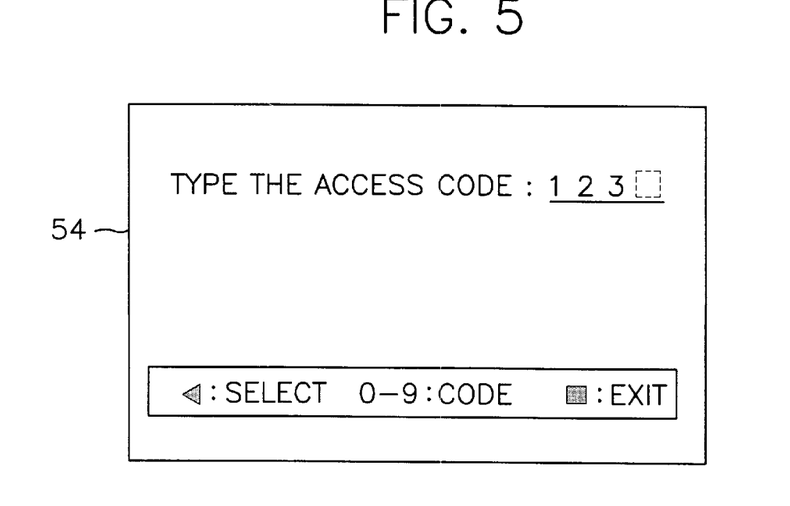
Figure 6:
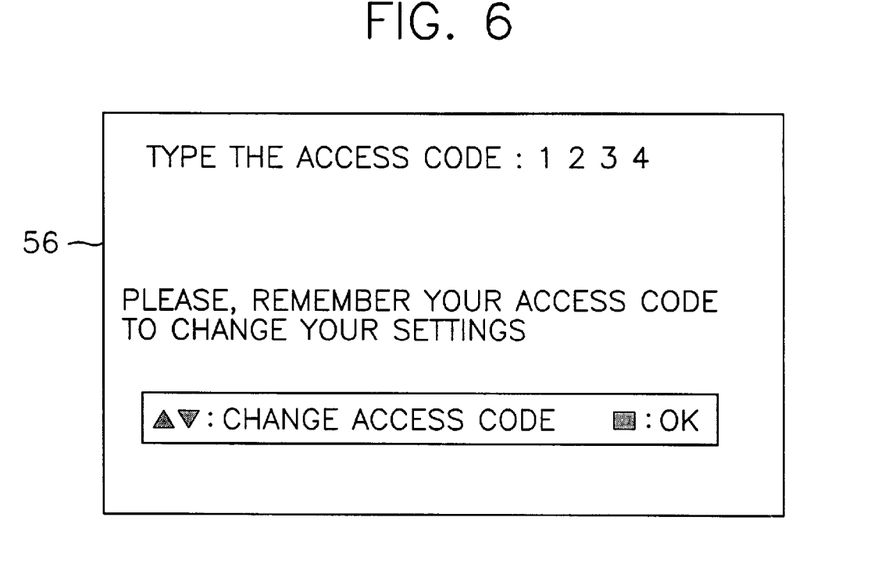
Figure 7:
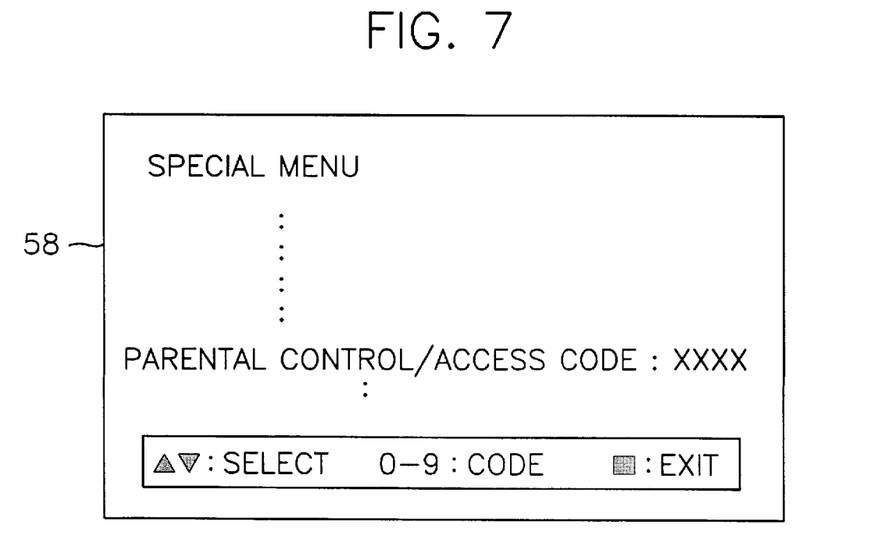
Figure 8:
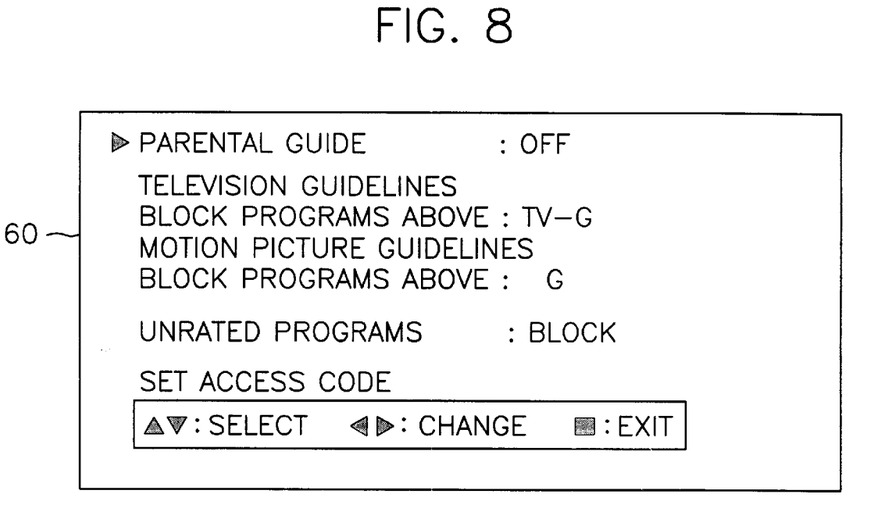

FIG. 4 is a flow chart illustrating a rating setting process of the present invention for imposing a restriction on watching. For the rating setting process, if a user selects a menu key of the remote controller (S200), the controlling section 22 provides the OSD data to the video circuit section 14 to display a menu screen 50 on the CRT 28 as shown in FIG. 4 (S202). As the user selects a PARENTAL CONTROL menu on the OSD screen 50 by moving a cursor 52 up and down, and registers the PARENTAL CONTROL menu by inputting left/right arrow keys, the PARENTAL CONTROL menu is selected (S204). The controlling section 22 checks whether a user's password, that is identification, has been previously set (S206). In the absence of a preset identification, an identification setting screen shown in FIG. 6 is displayed on CRT 28 (S208). With moving the cursor on this screen, the user can input identification number consisting of four digits selected from zero to nine (S210). After the completion of inputting the identification number, an identification screen 56 shown in FIG. 6 is displayed (S212). If the user operates an up/down key, the controlling section 22 recognizes this key operation as a command for an identification change (S214), and implements step S208. If the user selects the OK menu in step S212 (S216), the identification number is registered as the user's identification. If the user's registered identification is known in step S206 or a new identification is registered in step S216, an identification input screen 58 of FIG. 8 is displayed (S218). As the user inputs the identification through the identification input screen 58, the controlling section 22 operates a comparison to check whether the registered identification, that is the preset identification, and the inputted identification are identical with each other (S220). If the two identifications are not identical, then step S218 is performed, otherwise, a watching restriction menu screen 60 shown as FIG. 8 is displayed on the CRT 28. Following functions can be set through the menu screen 60: i) PARENTAL GUIDE, ii) TELEVISION GUIDELINES, iii) MOTION PICTURE GUIDELINES, iv) UNRATED PROGRAMS, and v) SET ACCESS CODE. On the menu screen 60, the user needs to move the cursor for selecting each menu from a target menu, and needs to press the left/right allow keys for changing the contents of each menu.

At first, a check-on as to whether to set the PARENTAL GUIDE menu is implemented (S224) and a selection can be done by toggling an ON/OFF key (S226). Selecting the PARENTAL GUIDE menu as ON will makes the restriction function on watching operative according to a set rating, but selecting it as OFF makes the restriction function inoperative.

Ratings of the TELEVISION GUIDELINES menu are classified according to age and television program's contents. If the TELEVISION GUIDELINES is selected (S228), then the user can select one rating from the following ratings, TABLE, TV-Y, TV-Y7, TV-G, TV-PG and TV-14, while circulating through these ratings (S230). The rating to be set is the one appearing on the screen.

Figure 9:
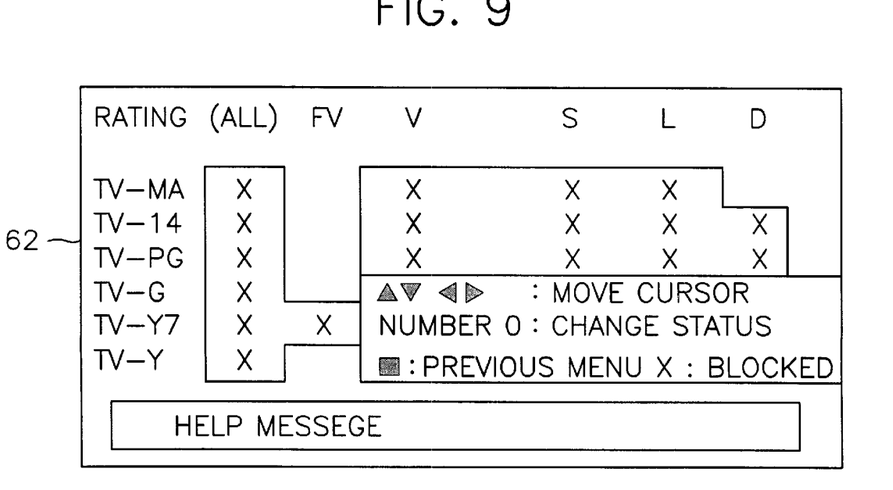
Figure 10:
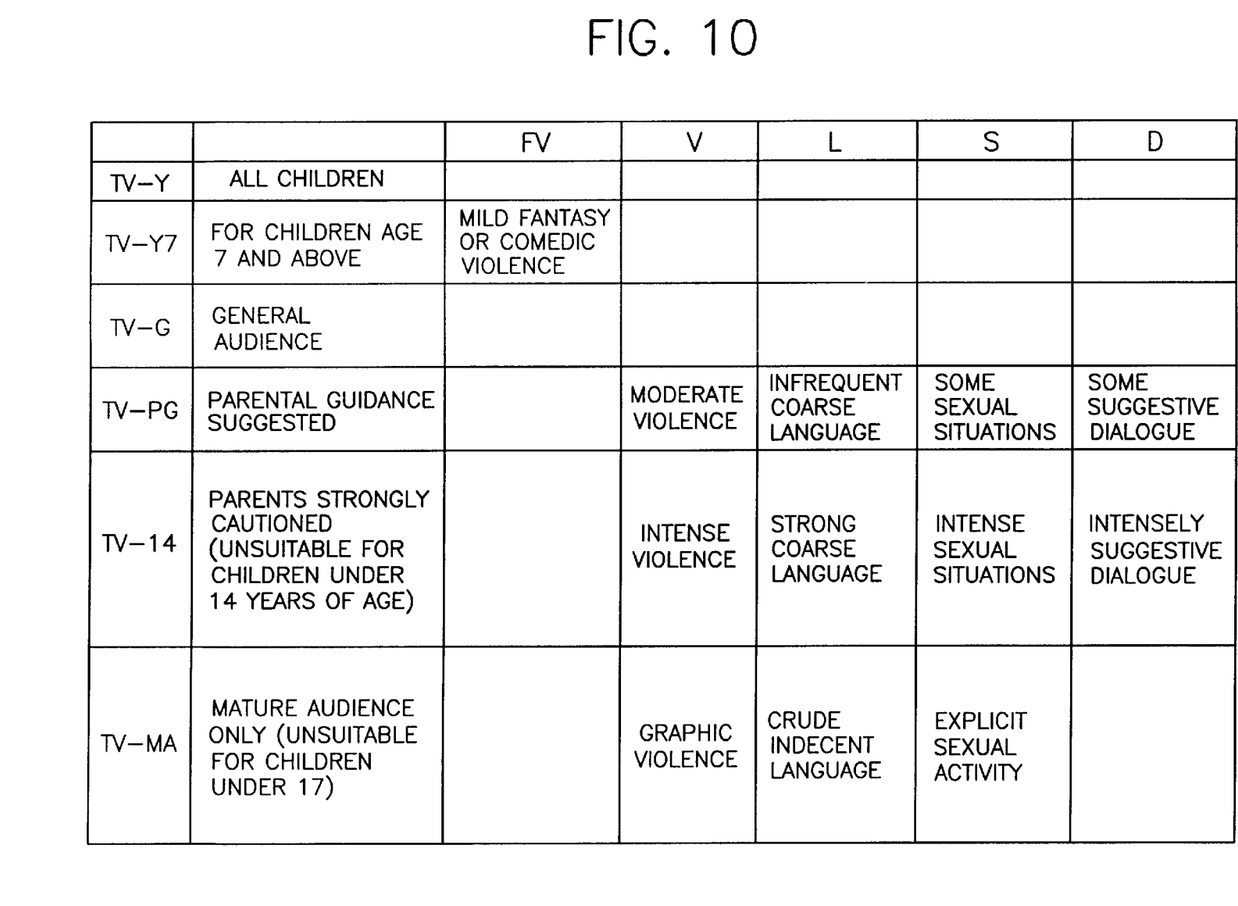
Figure 11:
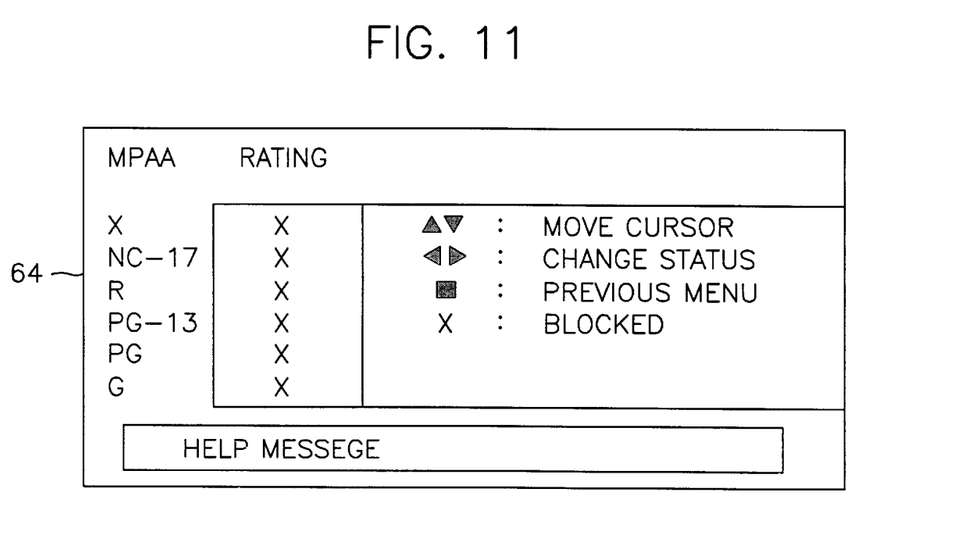

If the TABLE menu is selected in step S230 (S232), a table menu screen 62 shown in FIG. 9 is displayed on the CRT (S234). The vertical axis of the table represents rating levels according to the ages of viewers, and the horizontal axis of the table represents rating classes according to the contents of programs. Selecting one rating from the table by operating the cursor achieves a setting of the rating to select (S236). Any programs whose ratings are not within the scope of the set rating are automatically blocked out. If the HELP MESSAGE menu is selected, a television guide message as shown in FIG. 10 is displayed on the bottom of the table menu screen 62.

Figure 12:
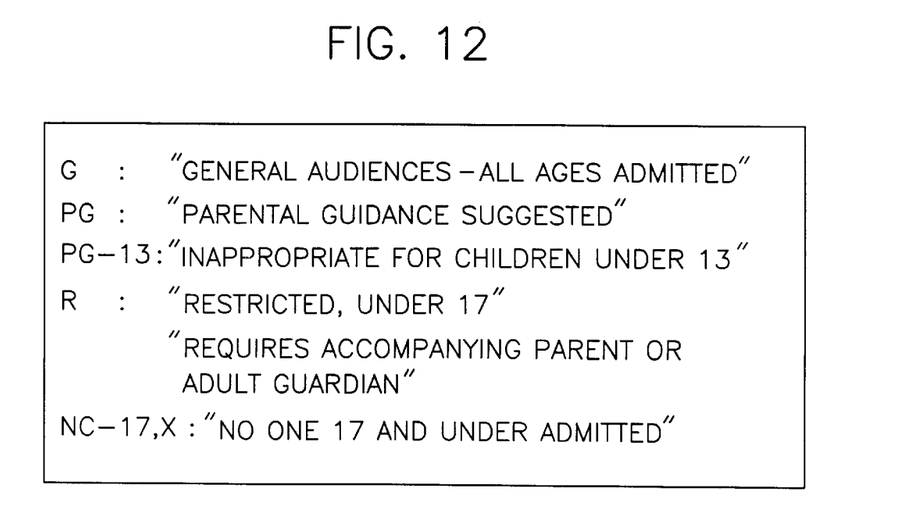

The MOTION PICTURE GUIDELINES classifies the ratings of movies according to the viewer's age. If the MOTION PICTURE GUIDELINES is selected (S238), then the user can select one rating from the following ratings, TABLE, X, NC-17, R, PG-13, PG and G, while circulating through these ratings (S230).The rating to be set is the one appearing on the screen. P If the TABLE menu is selected in step S240 (S242), a table menu screen 64 shown in FIG. 12 is displayed on the CRT (S244). The vertical axis of the table represents rating levels according to the ages of viewers. Selecting one rating from the table by operating the cursor achieves a setting of the rating to select (S246). Any programs whose ratings are not within the scope of the preset rating is automatically blocked out. If the HELP MESSAGE menu is selected, a movie guide message as shown in FIG. 12 is displayed on the bottom of the table menu screen 64.

If the UNRATED PROGRAMS menu is selected through the watching restriction menu screen 60 in step 222, the blocking function is toggled into ON or OFF (S250). The operative or inoperative status of the blocking function for the unrated programs is set by the status displayed on the screen. On the watching restriction menu screen 60, if the SET ACCESS CODE menu is selected for setting the identification (S252), then step 208 is implemented. if the EXIT is selected (S254), then displaying the menu screen of step S202 is implemented.

Figure 13:
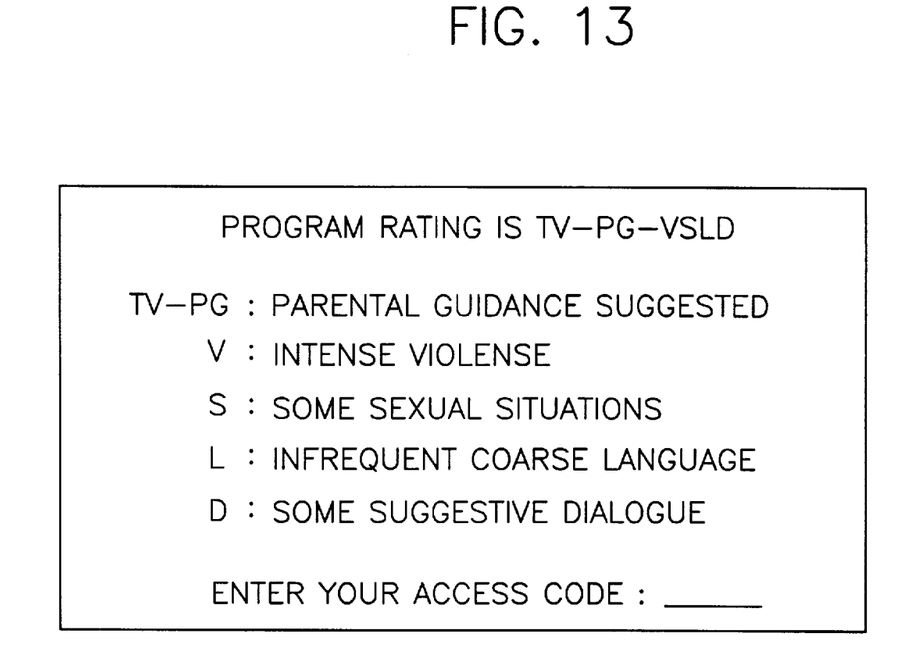

As described above, if the rating of the received program is not within the scope of the preset rating, the controlling section operates to block out the video and audio outputs. At that time, this blocking-out status is displayed in a way of the OSD screen, as shown in FIG. 13. On the blocking-out screen, a text for notification of the preset rating is shown. To release the blocking status, the user has to input an authorized identification, and modify the preset rating in the watching restriction mode.

As known from the above, for the blocking operation the present invention has an output screen horizontally distorted by forcing the AFC section for the horizontal sync signal inoperative, and thereby resulting in an inviewable screen. watching. According to the present invention, the blocking-out function can be simply accomplished without requiring any particular circuit such as a scrambling circuit.

While preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A method for blocking out an output of a video program, comprising the steps of:

extracting a rating signal from a video signal of the video program;

decoding the extracted rating signal to detect a rating of the video program;

comparing the rating of the video program with a preset rating; and blocking out the output of the video signal by making an automatic frequency control circuit inoperative when the rating of the video program is not within a scope of the preset rating from the comparison.

2. A receiving apparatus having a restriction function on watching a video program, comprising;

a receiving means for receiving a broadcast program of a selected channel and for outputting video and audio signals;

an audio circuit means for receiving the audio signal and for processing the audio signal to output;

a video circuit means for receiving the video signal and for processing the video signal to output;

a sync separating means for separating a composite sync signal of the video signal provided from the video circuit means into a vertical sync signal and a horizontal sync signal;

an automatic frequency control means for generating a phase difference signal by comparing the separated horizontal sync signal with a horizontal output signal;

a horizontal oscillating means, responsive to the phase difference signal of the automatic frequency control means, for generating a horizontal oscillating signal;

a horizontal output means, responsive to the horizontal oscillating signal provided from the horizontal oscillating means, for driving a horizontal deflection coil;

a decoding means for extracting a program rating signal from the video signal and for decoding the extracted program rating signal to output a program rating;

a command inputting means for setting a preset rating and a password;

a memory means for storing the password and the preset rating; and a controlling means for making the automatic frequency control means inoperative to display an inviewable screen when the program rating decoded by the decoding means is above than the preset rating stored in the memory means.

3. The receiving apparatus as claimed in claim 2, wherein said automatic frequency control (AFC) means includes a comparing signal generating means for generating a comparing signal by using a horizontal output signal from the horizontal output means; a first switching means, responsive to an inoperative signal from the controlling means, for switching the horizontal sync signal; a second switching means, responsive to the inoperative signal from the controlling means, for switching the comparing signal; a phase difference detecting means for detecting a phase difference between the horizontal sync signal supplied from the first switching means and the comparing signal supplied from the second switching means; and an integrating means for generating the phase difference signal by integrating the detected phase difference.

* * * * *